United States Patent [19]

Goloff et al.

[11] 4,033,231

[45] July 5, 1977

[54] APPARATUS FOR MACHINING END HOUSINGS

[75] Inventors: Alexander Goloff, East Peoria; Hiram A. Brubaker, Peoria, both of Ill.

[73] Assignee: Caterpillar Tractor Co., Peoria, Ill.

[22] Filed: Apr. 8, 1976

[21] Appl. No.: 675,023

[52] U.S. Cl. .............................. 90/24.3; 51/101 R; 90/13.9

[51] Int. Cl.² ...................... B23D 5/04; B24B 17/02

[58] Field of Search ............ 51/101 R, 50 PC, 67, 51/364, 365, 97 R, 97 NC; 90/20, 24.3, 24.5, 13.9

[56] References Cited

UNITED STATES PATENTS

| | | | |
|---|---|---|---|
| 1,014,306 | 1/1912 | Johnson | 51/101 R |
| 1,326,462 | 12/1919 | Murch | 51/101 R |
| 2,284,319 | 5/1942 | Herrmann | 51/101 R |
| 2,498,701 | 2/1950 | Munro | 51/219 PC |
| 2,510,557 | 6/1950 | Cover | 51/101 R |
| 3,782,040 | 1/1974 | Harle | 51/67 X |
| 3,943,664 | 3/1976 | Broide | 51/101 R |
| 3,975,866 | 8/1976 | Walker | 51/97 R |

*Primary Examiner*—Al Lawrence Smith
*Assistant Examiner*—Nicholas P. Godici
*Attorney, Agent, or Firm*—Wegner, Stellman, McCord, Wiles & Wood

[57] ABSTRACT

Apparatus for machining the end walls of slant axis rotary mechanisms including a base, a support pivoted on the base for rotation about a first axis, a shaft journalled on the support for rotation about a second axis nonparallel to the first axis, a work holder carried by the shaft for receiving a housing element of a slant axis rotary mechanism to have an end wall machined thereon, a tool adjacent the work holder operable to perform a machining operation on a housing element received on the work holder, a drive for rotating the shaft, and a mechanism responsive to the rotation of the shaft for oscillating the support about the first axis in timed relation to rotation of the shaft so that a housing element will be rotated and oscillated against the tool to machine an end wall thereon.

7 Claims, 7 Drawing Figures

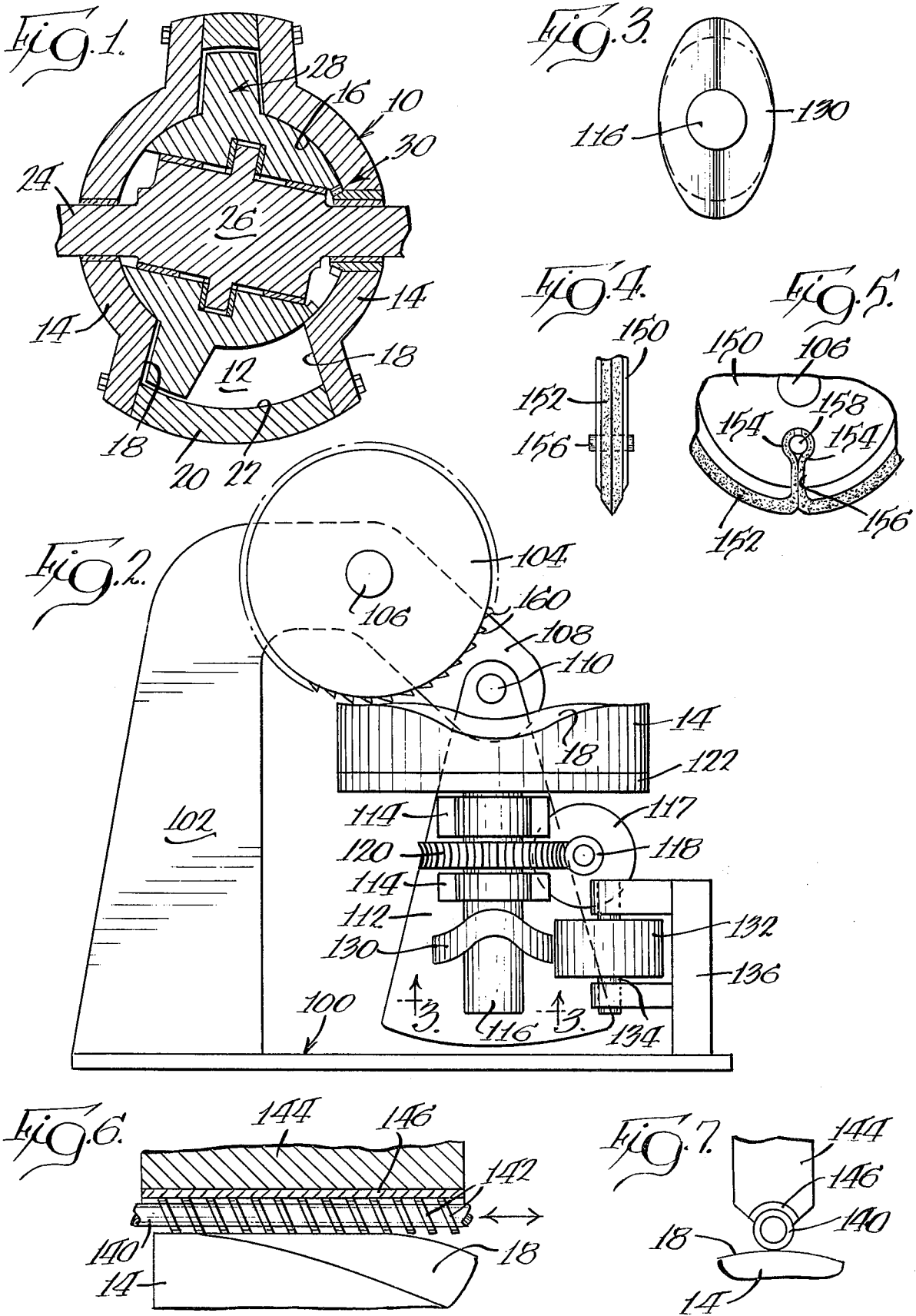

APPARATUS FOR MACHINING END HOUSINGS

BACKGROUND OF THE INVENTION

This invention relates to slant axis rotary mechanisms employed as engines, pumps, compressors, expanders, or the like. More specifically, it relates to apparatus for machining the end walls customarily employed in such mechanisms.

As is well known, in four-cycle slant axis rotary mechanisms, the end walls interconnecting the radially inner and outer spherical walls are extremely difficult to form for a variety of reasons. For one, such walls appear to be conical and, in developed view, have sinusoidal characteristics as well. Secondly, in many prior constructions, the machine marks extend on such walls generally circumferentially which is parallel to the mean direction of seal travel. As a consequence, the maintenance of a good oil film is made difficult resulting in rapid seal wear.

SUMMARY OF THE INVENTION

It is the principal object of the invention to provide a new and improved apparatus for machining end walls on housing elements for use in slant axis rotary mechanisms. More specifically, it is an object of the invention to provide such an apparatus wherein the complicated conical and sinusoidal shapes are easily formed with machine marks extending generally radially so that when employed in engines or other mechanisms, oil film maintenance is promoted with the resultant increase in seal life.

An exemplary embodiment of the invention achieves the foregoing object in a mechanism including a base. A support is pivoted on the base for rotation about a first axis and a shaft is journalled on the support for rotation about a second axis nonparallel to the first axis. A work holder for receiving a housing element to have an end wall machined thereon is carried by the shaft and a tool is disposed adjacent the work holder to perform machining operations on housing elements received on the work holder. Means are provided for rotating the shaft and means are included to be responsive to rotation of the shaft for oscillating the support about the first axis in timed relation to the rotation of the shaft. Rotation of the shaft tends to effect the machining of the conical configuration of the end walls, while oscillation of the support tends to effect the machining of the sinuoidal configuration.

In a preferred embodiment of the invention, the oscillation means include a cam rotatable responsibly with the shaft and carried by the support and a cam follower journalled on the base and engaging the cam.

In a highly preferred embodiment employed for the formation of four-cycle mechanisms, the cam is oval shaped and is rotated at the same angular velocity as the shaft. Preferably, according to this embodiment, the cam is carried by the shaft.

In order to provide for generally radially extending machine marks on the end walls, one embodiment of the invention contemplates reciprocally mounting the tool for movement across the work holder.

Another embodiment, to achieve the same object, employs a tool in the form of a rotatable disc journalled for rotation about an axis substantially parallel to the axis about which the support is rotatable.

In one embodiment, the tool includes a flexible abrasive band disposed about the periphery of a rotatable disc. The ends of the band are received in an inwardly directed slot in the disc and a locking pin is located in the slot radially inwardly of the periphery of the disc and frictionally engages the band ends to hold the same in place.

Other objects and advantages will become apparent from the following specification taken in connection with the accompanying drawings.

DESCRIPTION OF THE DRAWINGS

FIG. 1 is a sectional view of a slant axis rotary mechanism, the end walls of which may be formed by the apparatus of the present invention;

FIG. 2 is a side elevation of an apparatus made according to the invention;

FIG. 3 is a fragmentary, sectional view taken approximately along the line 3—3 in FIG. 2;

FIG. 4 is a fragmentary view of a finishing tool which may be employed in the apparatus;

FIG. 5 is a fragmentary view of the finishing tool illustrated in FIG. 4 taken at approximately right angles to the view of FIG. 4;

FIG. 6 illustrates an alternate form of tool that may be employed in the invention; and FIG. 7 is a view of the tool of FIG. 6 taken at approximately right angles thereto.

DESCRIPTION OF THE PREFERRED EMBODIMENTS

A typical slant axis rotary mechanism is illustrated in FIG. 1 in the form of a four-cycle engine and includes a housing, generally designated 10, defining an operating chamber 12. The housing 10 includes housing elements 14 which include a radially inner spherical wall 16 and opposed end walls 18. A housing element 20 carries a radially outer spherical wall 22. A shaft 24 having an eccentric 26 is suitably journalled in the housing elements 14 and, in turn, journals the usual rotor 28 within the operating chamber 12. Phase gearing, generally designated 30, carried by the housing and by the rotor complete the mechanism in its most basic sense.

A variety of seals (not shown) are carried by the rotor. For example, peripheral seals are carried by the radially outer part of the rotor 28 and sealingly engage the radially outer spherical surface 22. Hub seals are carried by the rotor for sealing engagement with the radially inner spherical surface 16 and plural apex seals on each side of the rotor flange engage respective ones of the end walls 18.

Such apex seals extend generally radially and, accordingly, in order to maintain a good oil film on the walls 18, it is desirable that the machine marks 18 thereon also extend generally radially as opposed to circumferentially. And, as is well known, in order to provide four-cycle characteristics, it is necessary that each of the end walls 18 be formed generally conically and sinusoidally.

The mechanism for accomplishing the foregoing machining operation is illustrated in FIG. 2 and includes a base, generally designated 100. An upright post 102 extends upwardly from the base and journals a toothed cutting tool 104 which is disposed for rotation about an axis of a shaft 106. The post 102 includes a downturned arm 108 which, by means of a pivot pin 110, pivotally supports a support 112 above the base 100.

The support 112 is illustrated in the form of a pie-shaped plate and one side thereof is provided with bearings 114 for journalling a shaft 116. The axis of rotation of the shaft 116, in the embodiment illustrated in FIG. 2, is transverse to the axis of rotation of the support 112 about the pivot 110 and extends through that pivot axis. However, such a relationship is not absolutely necessary, it only being required that the axis of rotation of the shaft 116 be nonparallel to the axis of rotation of the support 112.

A motor 117 is mounted in any suitable fashion on the support 112 for movement therewith and includes a worm 118 on its output shaft meshed with a worm gear 120 carried by the shaft 116. Consequently, upon energization of the motor 117, the shaft 116 will be rotated.

The upper end of the shaft 116 carries a work holder schematically illustrated at 122 for receipt of a housing element 14 which is to have an end wall surface 18 machined thereon. Any suitable means known in the art may be employed to secure the housing element 14 to the work holder 122 for movement of the former with the latter.

The shaft 116 also carries an oval-shaped cam 130 (FIGS. 2 and 3) which engages a rotatable cam follower 132 journalled by a shaft 134 to a pedestal 136 on the base 100.

As a result of the foregoing, energization of the motor 117 will cause rotation of the work holder 122 with the resultant rotation of the housing element 14 about the axis of the shaft 116 whereby the tool 104 will machine a portion of the surface 118. Responsive to such rotation, the cam 130 and cam follower 132 cause the support 112 to oscillate back and forth about the pivot axis provided by pin 110 in timed relation to the rotation of the shaft 116. As a consequence, by reason of the configuration of the cam 130, as shown in FIG. 3, a conical and sinusoidal end wall 18 will be formed on the housing element 14.

As illustrated, the tool 104 will cause the end wall surface to be somewhat concave. In many mechanisms, such a configuration is desirable by reason of its minimizing the tendency of a housing element 14 of a given strength to distort under compressive loads. In the event such a shape is not desired, the tool 104 could be reciprocated across the work holder 122, that is, toward and away from the axis of the shaft 116.

Alternately, a reciprocal saw or hob 140, illustrated in FIGS. 6 and 7, could be employed. The hob 140 is provided with helical teeth 142 for the reason that such teeth are more economically formed. Where economics is not of prime concern, concentric teeth could be employed.

Preferably, a backing element 144 backs the hob 140 to prevent excessive deflection during reciprocation across the work holder 122. In most cases, a rubber element 146 may be interposed between the hob 140 and the backing element 144. But where even more rigidity is required, the backing element may have teeth extending into the root of the teeth of the hob 140 for backup purposes.

FIGS. 4 and 5 illustrate a finishing disc 150 which may be employed in finishing operations on a housing element 114. A flexible, elastic band 152 saturated with abrasive is extended about the periphery of the disc 150 and includes ends 154 which extend into a slot 156 located radially inwardly of the periphery of the disc. A locking pin 158 is disposed in the slot 156 to frictionally engage the ends 154 of the band 152 and firmly hold the same in place.

Of particular significance in connection with the disc 104 and the disc 150 is the fact that the teeth 160 employed on the disc 104 and the radius of the finishing surface of the band 154 can be quite closely controlled. In general, it is desired that the same have the same radius as the radius of the apex seals to be employed in the mechanism whose end walls are being formed so that a good seal will be present during operation. It is particularly noted that the radii employed on apex seals are quite small and the structures illustrated herein are quite satisfactory for performing machining operations while having relatively small radii on their abrasive surfaces.

From the foregoing, it will be appreciated that an apparatus made according to the invention is quite simple in terms of the elements required and is capable of machining the conical and sinusoidal surfaces required of end housing elements in slant axis rotary mechanisms. It will also be appreciated that the apparatus machines such housings with the machine marks extending generally radially to promote seal life through the maintenance of a good oil film.

It will be appreciated that while the apparatus has been described in terms of a four-cycle mechanism, the principles of the invention may be employed in mechanisms operating on any number of cycles.

What is claimed is:

1. Apparatus for machining the end walls of slant axis rotary mechanisms, comprising:
    a base;
    a support pivoted on said base for rotation in a single plane about a first axis;
    a shaft journalled on said support for rotation about a second axis nonparallel to said first axis and movable with said support in said single plane;
    a work holder carried by and rotatable with said shaft for receiving a housing element of a slant axis rotary mechanism to have an end wall machined thereon said work holder being shiftable with said shaft only in said single plane;
    means, including a tool adjacent said work holder operable to perform a machining operation on a housing element received on said work holder;
    means for rotating said shaft; and
    means responsive to rotation of said shaft for oscillating said support about said first axis in timed relation to rotation of said shaft,
    whereby a housing element will be rotated and oscillated against said tool to machine an end wall thereon.

2. The apparatus of claim 1 wherein said tool is mounted for reciprocation across said work holder.

3. The apparatus of claim 1 wherein said tool is a rotatable disc journalled for rotation about an axis substantially parallel to said first axis.

4. The apparatus of claim 3 wherein said oscillating means includes an oval shaped cam rotatable at the same angular velocity as said shaft.

5. The apparatus of claim 4 wherein said cam is carried by said shaft.

6. Apparatus for machining the end walls of slant axis rotary mechanisms, comprising:
    a base;
    a support pivoted on said base for rotation about a first axis;
    a shaft journalled on said support for rotation about a second axis nonparallel to said first axis;

a work holder carried by said shaft for receiving a housing element of a slant axis rotary mechanism to have an end wall machined thereon;
a cutting tool;
means mounting said tool adjacent said work holder for reciprocation across said work holder to provide generally radially extending machine marks on an end wall received on said work holder;
means for rotating said shaft; and
cam means rotated by said shaft and engageable with cam following means supported by said base for oscillating said support about said first axis in timed relation to the rotation of said shaft, whereby a housing element will be rotated and oscillated against said tool to machine an end wall thereon.

7. Apparatus for machining the end walls of slant axis rotary mechanisms, comprising:
a base;
a support pivoted on said base for rotation about a first axis;
a shaft journalled on said support for rotation about a second axis nonparallel to said first axis;
a work holder carried by said shaft for receiving a housing element of a slant axis rotary mechanism to have an end wall machined thereon;
rotatable tool means adjacent said work holder and rotatable about a third axis parallel to said first axis to perform a machining operation on a housing element received on said work holder;
means for rotating said shaft; and
cam means rotated by said shaft and engageable with cam following means supported by said base for oscillating said support about said first axis in timed relation to the rotation of said shaft, whereby a housing element will be rotated and oscillated against said tool to machine an end wall thereon.

* * * * *